United States Patent [19]

Sherman et al.

[11] Patent Number: 4,956,810
[45] Date of Patent: Sep. 11, 1990

[54] HIGH SPEED METHOD FOR DATA TRANSFER

[75] Inventors: Arthur M. Sherman, Morgan Hill; Peter C. Yanker, Portola Valley, both of Calif.

[73] Assignee: International Business Machines Corporation, Armonk, N.Y.

[21] Appl. No.: 242,326

[22] Filed: Sep. 6, 1988

[51] Int. Cl.$^5$ .............................................. G06F 13/00
[52] U.S. Cl. .................... 364/900; 364/964.6; 364/947.4
[58] Field of Search ... 364/200 MS File, 900 MS File

[56] References Cited
U.S. PATENT DOCUMENTS

| | | | |
|---|---|---|---|
| 3,987,419 | 10/1976 | Morrill et al. | 364/200 |
| 4,148,098 | 4/1979 | McCreight et al. | 364/200 |
| 4,601,009 | 7/1986 | Kogawa et al. | 364/900 |

*Primary Examiner*—Thomas M. Heckler
*Attorney, Agent, or Firm*—Perman & Green

[57] ABSTRACT

A method is described for transferring data units from a serially organized memory to a bit planar organized memory. The method first selects a plurality of data units from the serially organized memory. A bit pattern from the selected data units is then captured, which bit pattern includes only bits to be stored in a subset of the storage planes of the bit planar organized memory. The bit pattern is processed to isolate from it, subsidiary bit patterns, one bit pattern for each storage plane in the bit planar memory. Each subsidiary bit pattern is then translated so that its bit sequence is properly oriented and is then stored in a plane of the bit planar organized memory. In a preferred embodiment of the invention, the translations take place as the result of a table look-up step.

12 Claims, 6 Drawing Sheets

TRANSFORM TABLE

| PLANE' | PLANE | MOVE |
|---|---|---|
| BIT 0 | BIT 2 | +2 |
| BIT 1 | BIT 6 | +5 |
| BIT 2 | BIT 0 | −2 |
| BIT 3 | BIT 4 | +1 |
| BIT 4 | BIT 3 | −1 |
| BIT 5 | BIT 7 | +2 |
| BIT 6 | BIT 1 | −5 |
| BIT 7 | BIT 5 | −2 |

FIG. 7

FIG. 9

HIGH SPEED METHOD FOR DATA TRANSFER

FIELD OF THE INVENTION

This invention relates to a method for transferring data from one memory to another memory and, more particularly, to a method for transferring data from a serially organized memory to a bit planar organized memory.

REFERENCE TO RELATED APPLICATION

This invention is related to an invention described in co-pending, U.S. patent application Ser. No. 07/242,327, filed 9-6-88, entitled High Speed method and Apparatus for Data Transfer, by Yanker and Sherman and assigned to the same assignee as this application.

BACKGROUND OF THE INVENTION

Personal computers (PC) are increasingly being called upon to interface with and control sophisticated graphics display systems. Such display systems require extraordinarily fast rates of data exchange with the PC. Nevertheless, most PC's today employ the well known word-at-a-time fetch system which accesses one word per memory cycle. Characteristically, PC memory cycles are some seven or more times slower than a PC's internal register and logic operations.

In graphics applications, serially organized memories are often employed to drive display units. Such memories store words end-to-end which words are serially accessed in a raster fashion. If it is desired to transfer data from a serially organized memory to a random access memory (RAM) which is bit planar oriented (as are many PC Rams), the usual sequence involves accessing a word from the serial memory; aligning it; and then reading the aligned bits into bit positions in various planes of the bit-planar RAM. This operation usually utilizes one memory cycle per word transfer with an attendant reduction in the PC's effective speed of operation.

Some PC's employ pipelining techniques to increase their processing speed. In essence, the pipeline technique involves a pre-fetching of an instruction or a group of instructions while one set of instructions is being executed. In memory transfers of the nature above described, the advantages gained by pipelining are lost since each word transfer ends with a "jump" instruction. That instruction causes the series of instructions used for a memory transfer to be reexecuted (or for the "loop" to fold back upon itself). The jump instruction "flushes" any pre-fetched instructions which have been pre-accessed and the potential look-ahead benefits are thus lost. One additional problem with a looped instruction structure is that it requires a register to maintain a count of the number of times the loop has been performed. Generally PC registers are in short supply when executing sophisticated graphics display application programs and the use of a count register is to be avoided, if possible.

Accordingly, it is an object of this invention to provide a method for transferring data from a serially organized memory to a bit planar organized memory wherein memory accesses are reduced.

It is a further object of this invention to provide a method for transferring data which is capable of handling plural words at a time.

It is a further object of this invention to provide a method for data transfer which avoids the use of loop instructions.

It is still another object of this invention to provide a method for data unit transfers from a serially organized memory to a bit planar organized memory wherein a translation step is employed which takes advantage of pre-existing relationships between bit positions in the data unit being transferred and bit position in the memory into which the transfer is occurring.

SUMMARY OF THE INVENTION

This invention comtemplates a method for transferring data units from a serially organized memory to a bit planar organized memory. The method first comprises selecting a plurality of data units from the serially organized memory. A bit pattern from the selected data units is then captured, which bit pattern includes only bits to be stored in a subset of the storage planes of the bit planar organized memory. The bit pattern is processed to isolate from it, subsidiary bit patterns, one bit pattern for each storage plane in the bit planar memory. Each subsidiary bit pattern is then translated so that its bit sequence is properly oriented and is then stored in a plane of the bit planar organized memory. In a preferred embodiment of the invention, the translations take place as the result of a table lookup step.

DETAILED DESCRIPTION OF THE INVENTION

Figure 1:
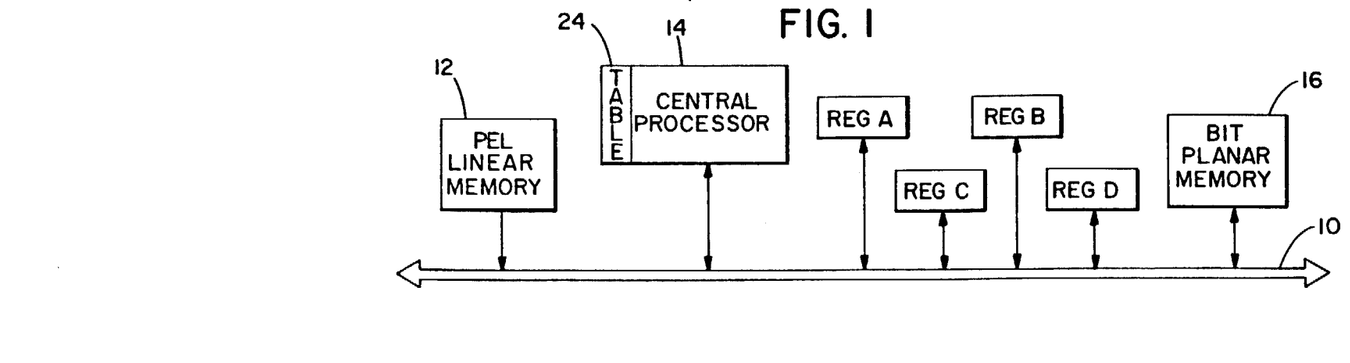
FIG. 1 is a circuit block diagram of the major elements which carry out the method of the invention.

Turning now to FIG. 1, a block diagram circuit is shown which is particularly adapted to carrying out the method of this invention. Bus 10 interconnects all elements of this system and provides both interconnecting data and command pathways. Interconnected with bus 10 are PEL linear memory 12, central processor 14, bit planar memory 16, and four registers A, B, C and D. It should be understood that while each of the elements of FIG. 1 are interconnected in a bus arrangement, that any appropriate interconnection arrangement is satisfactory so long as it enables both data and control signal flow between the components shown.

Figure 2:
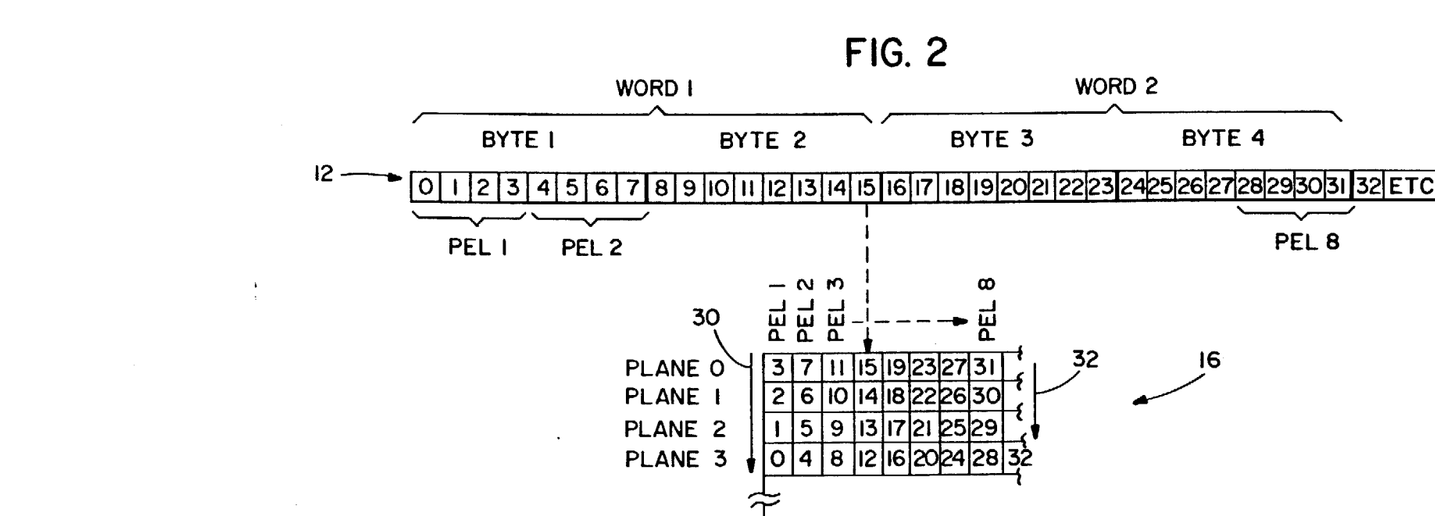
FIG. 2 is a schematic which indicates the bit layouts of a PEL linear memory and a corresponding bit planar memory.
Figure 3:
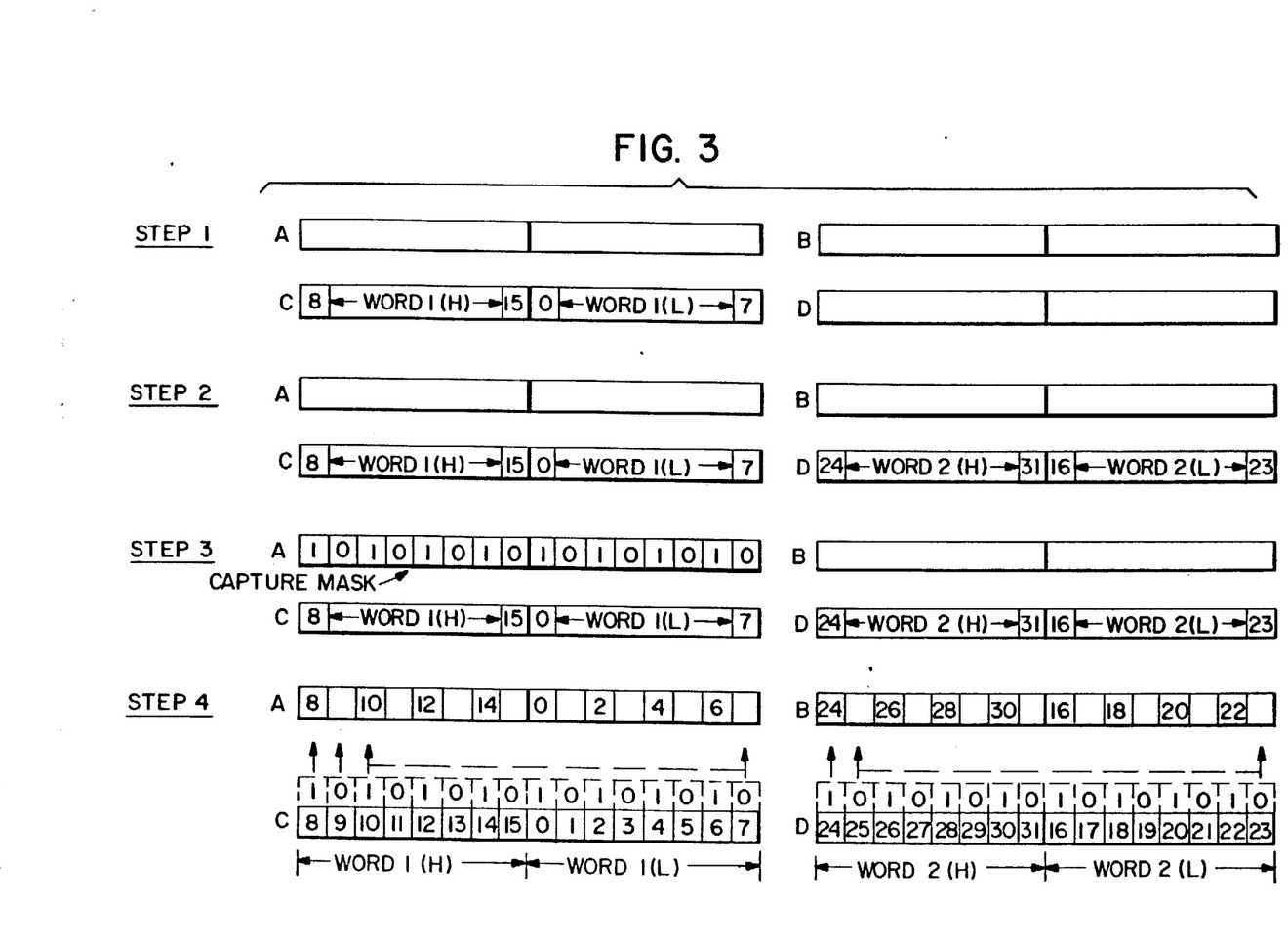
FIG. 3–FIG. 6 are schematic views of registers A–D as they appear during steps 1-16 of the invention.
Figure 4:
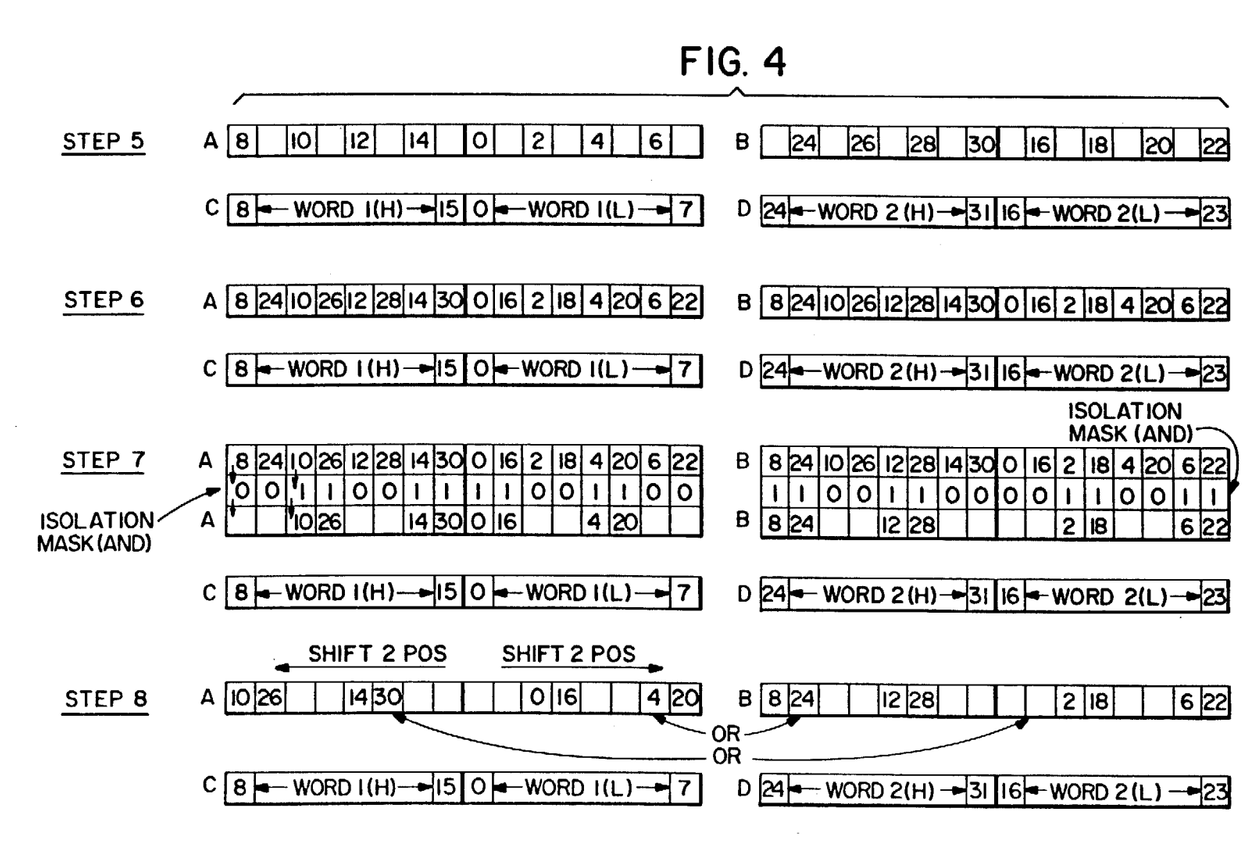

Referring to FIG. 2, PEL linear memory 12 is shown, schematically, as comprising a plurality of bytes. Each byte position contains eight bits, with the individual bytes being strung together in a serial fashion. Each byte contains two four bit data units, each data unit, for example, providing a color code for an individual picture element (PEL). Thus, the data contained in bit positions 0-3 of byte 1 provides an indication of which of sixteen colors, PEL 1 should display. A word in PEL linear memory 12 comprises two bytes and contains the data for four PEL's.

The objective of this invention is to transfer, rapidly, the bits indicative of the colors of PEL's 1–N into bit planar memory 16. In memory 16, each data unit (e.g. PEL) is organized on a bit-per-plane basis. For instance, the first bit of a PEL data unit occupies the first bit position in plane 3; the second bit occupies the first bit position in plane 2, etc. When bit planar memory 16 is accessed to obtain data pertaining to a particular PEL, corresponding bit positions in planes 0–3 are simultaneously addressed and read out into a buffer to thereby assemble the desired data unit.

From an examination of planes 0–3 of bit planar memory 16, it can be seen that planes 0 and 2 contain all odd bit positions, whereas planes 1 and 3 contain all even bit positions. While only PEL's 1–8 are shown in FIG. 2, it should be understood that bit planar memory 16 is preferably provided with sufficient memory positions to enable at least a full scan line to be stored therein. For instance, if a display unit has 640×480 PEL's, plane 0 will be provided with 640 bit positions as will each of planes 1–N.

Returning now to FIG. 1, central processor 14 controls the operation of the algorithm to be hereinafter described below. Central processor 14 also is provided with a translation table 24 whose function will be described in conjunction with the algorithm of the invention. Each of registers A–D is two bytes long (16 bits). Each of these registers is capable of accepting data from any unit attached to bus 10 and is further capable of returning such data to any such unit. As will hereinafter be realized, the system additionally employs bit masks for various functions. Under certain circumstances, a bit mask is read into one of registers A–D or, it is maintained within a register (not shown) in central processor 14. In the latter case, the data to be controlled by such mask is fed to the central processor 14 for operation and then returned to an appropriate register.

A bit mask can be operated either as an AND or as an OR function. If the bit mask operates as an AND function, each position of the bit mask which contains a one is ANDED with a bit contained in the corresponding position in a register which is subjected to the mask. In other words, data appearing in a register bit position which is ANDED with a one from a corresponding mask: position is returned to the register with an identical data form. On the other hand, if the bit mask: has a 0 in a position corresponding to a particular register position, a zero is forced back into the corresponding register position irrespective of the data originally contained therein.

Referring now to FIGS. 3–6, the method (algorithm) of the invention will be described in conjunction with FIGS. 1 and 2. In each of FIGS. 3–6, registers A–D are schematically shown and their contents are illustrated at each stage of the operation.

STEP 1

Word 1, which includes bytes 1 and 2 from PEL linear memory 12 is loaded into register C. The high order (H) bits of (byte 2) of word 1 are loaded into the left-most bit positions of register C whereas the low order (L) bits (byte 1) are loaded into the right-most bit positions of register C. There is no particular significance to the order of storage of the high and low order bytes in register C other than the fact that many PC's are controlled by Intel Corporation, 8080 series processors which operate to load registers in the aforementioned fashion.

STEP 2

Word 2 is loaded into register D from PEL linear memory 12 with its high order bits (byte 4) loaded into the left most bit positions of register D and its low order bits (byte 3) into the right-most bit positions.

STEP 3

A "capture" mask is loaded into register A. The mask is used to isolate and capture the bits from both words 1 and 2 which will eventually reside in planes 1 and 3 of bit planar memory 16. It will be recalled that planes 1 and 3 contain only even numbered bit positions. Thus, it will be noted that the capture mask in register A has ones positioned at each even bit position and zeros at all odd bit positions.

STEP 4

The bits in capture mask A are ANDED with the data in the corresponding bit positions in registers C and D. The results are stored in registers A and B and the original contents of registers C and D are rewritten back into registers C and D. Thus, as can be seen from Step 4 in FIG. 3, registers A and B contain all of the bit positions, but not in proper order, which will eventually appear in planes 1 and 3 of bit planar memory 16.

STEP 5

The bit positions in register B are rotated one position to the right. This shift is for the purpose of aligning the data contents of register B with the empty bit positions of register A so that they may be both combined into register A. This combination occurs in such the same way a zipper operates, i.e., the data from the two registers are integrated by melding the contents of one into the empty spaces of another. Thus this algorithm is sometimes called "Zipper".

STEP 6

The contents of register B are then OR'd with the contents of register A and the results copied back into both registers A and B. Each of registers A and B now contains a full set of bit positions which will appear in planes 1 and 3 of bit planar memory 16.

STEP 7

It is now necessary to isolate the bits to be stored in the individual planes in bit planar memory 16. This is accomplished by ANDING the contents of registers A and B with an isolation mask and then writing the results back into registers A and B. In particular, an isolation mask is established in a register within central processor 14, which mask is as follows: 0011001111001100. It will be noted that when the bits of the isolation mask are ANDED with the bit position contents of register A and the results rewritten into register A, that the first byte of register A is caused to contain four of the bit positions which are to appear in plane 1 of planar memory 16 and the second byte of resister A, four of the bit positions which will eventually appear in plane 3 of bit planar memory 16. The complement of the aforementioned isolation mask, (1100110000110011) is ANDED with the contents of register B and the results are returned to register B. The first byte of register B thereby contains four bit positions which will appear in plane 3 and the second byte contains four bit positions which will appear in plane 1 of bit planar memory 16. Thus, the left-most byte of register A and right-most byte of register B contain all eight bit positions for plane 1 of bit planar memory 16 and the right-most byte of Register A and left-most byte of register B contain all of bit positions for plane 3 thereof.

STEP 8

The bit positions in the left-most byte of register A are shifted two positions to the left and the right-most byte, two bit positions to the right. This makes room for the subsequent insertion of the bits stored in register B. Next, the left-most byte of register B is OR'd into the right-most byte of register A and the right-most byte of register B is OR'd into the left-most byte of register A.

STEP 9

Figure 5:
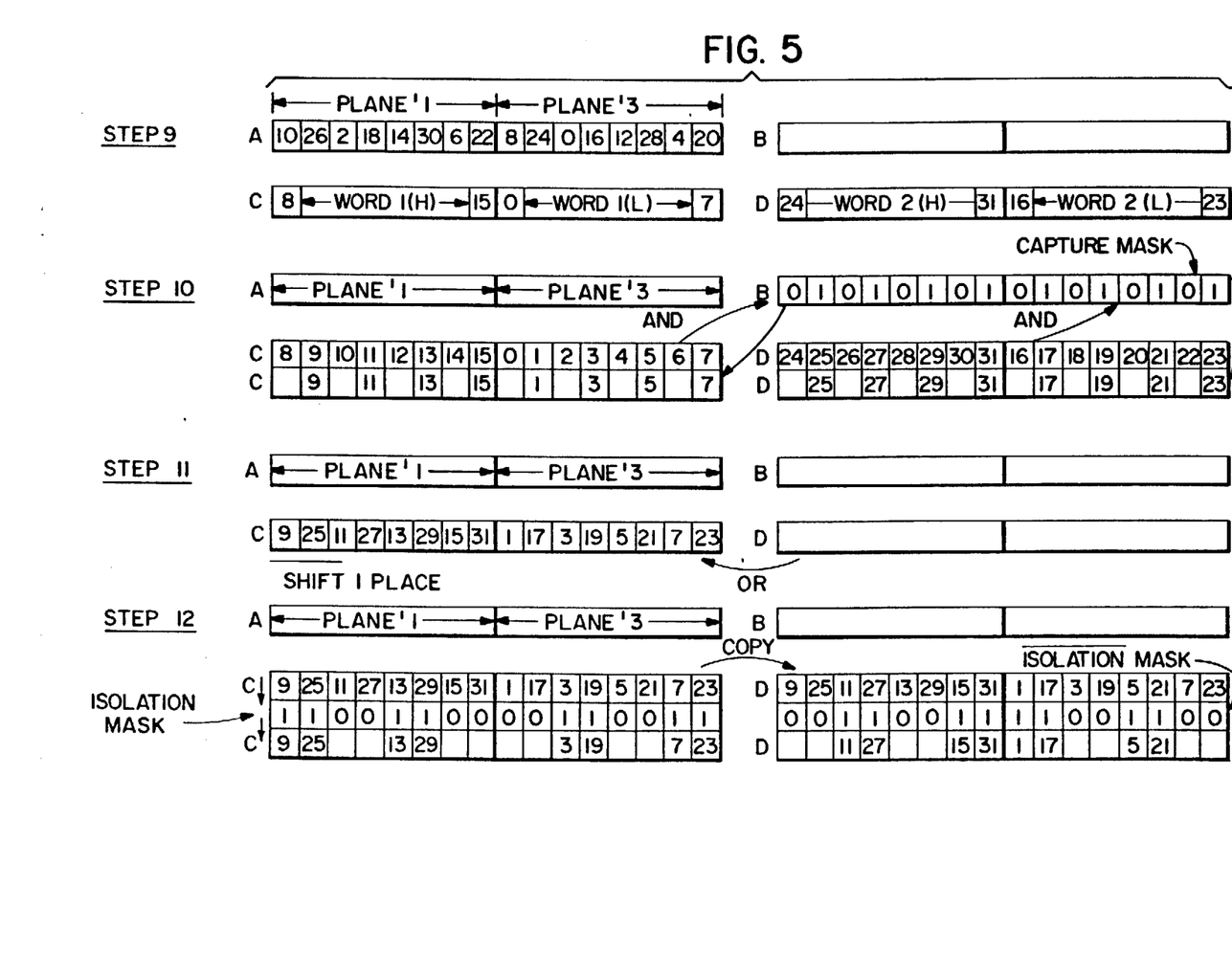

The results of the OR operation in Step 8 are illustrated in register A (FIG. 5). It will be noted that the left most byte of register A now contains all of the bit positions to be placed in plane 1 of bit planar memory 16. However, those bit positions are not stored in proper order. Thus, for the purposes of further discussion the left-most byte in register A will be hereinafter referred to as "plane' 1". In the same manner, the right most byte of register A will be hereinafter designated as "plane' 3".

At this stage of the algorithm's operation, register A contains all the bit positions to be inserted into planes 1 and 3 of bit planar memory 16, although not in the proper order. Now, a similar isolation and segregation of the odd bit positions to be stored in planes 0 and 2 of bit planar memory 16 is commenced.

STEP 10

The capture mask is loaded into register B and the contents of registers C and D are ANDED therewith, with the results being placed backed into registers C and D.

STEP 11

The contents of register C are shifted one place to the left and the contents of register D are subsequently OR'd into register C to form a consolidated series of odd numbered bit positions.

STEP 12

The contents of register C are copied into register D and the contents of both registers are ANDED with isolation masks to again accomplish the segregation of the various bit positions into respective bytes of registers C and D. In specific, an isolation mask (11001100001110011) is ANDED with the bit positions of register C and the results are rewritten into register C. The complement of the aforementioned isolation mask is ANDED with the contents of register D and the results rewritten into register D.

STEP 13

The bit positions in the left-most byte of register D are shifted two positions to the left and the byte positions in the right-most byte are shifted two positions to the right. Subsequently, the contents of register C are OR'd into register C to complete the consolidation.

STEP 14

Figure 6:
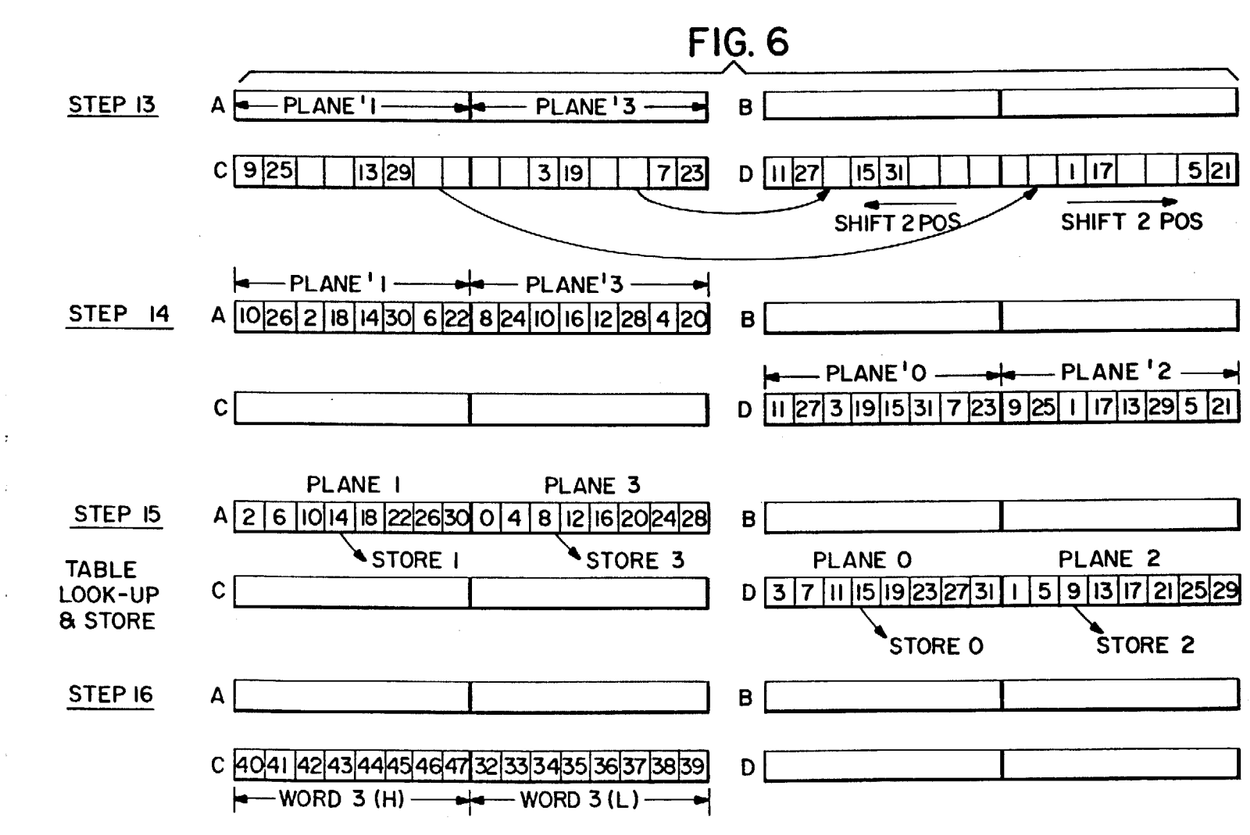

As shown in FIG. 6, registers A and D include respectively, the following: plane' 1, plane' 3, plane' 0, and plane' 2. It will be remembered that the bit positions contained within each byte are not in the proper order to be stored in the respective planes of bit planar memory 16.

As a consequence of the above noted steps of the algorithm, it can be seen that the bit positions of each byte of PEL linear memory 12 invariably becomes reordered in the manner shown in Step 13. Thus, each bit position has a predetermined relationship to its final destination in one of the planes of bit planar memory 16.

Figure 7:
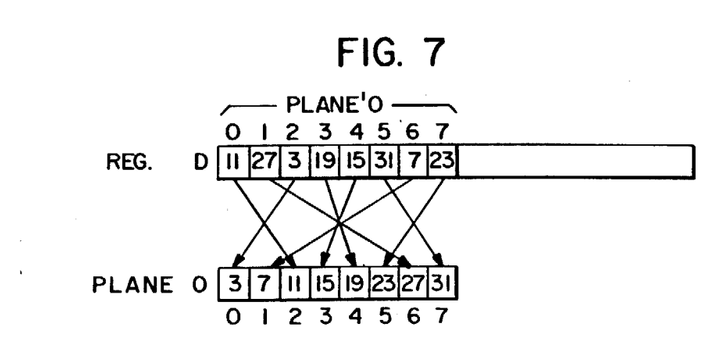
FIG. 7 is a schematic view indicating the relationship of the bit positions in a byte in register D to the bit positions, as they should appear, in plane 0 of the bit planar memory.

Referring to FIG. 7, this relationship is illustrated by an example which shows the left-most byte of register D (plane' 0). Beneath register D is illustrated plane 0 from bit planar memory 16 with its bit positions shown in their proper order. The arrows shown from each bit position of register D to the bit positions of plane 0 illustrate the movement which must occur to cause the bits in register D to be properly reordered so that they can be stored in plane 0.

Figure 8:
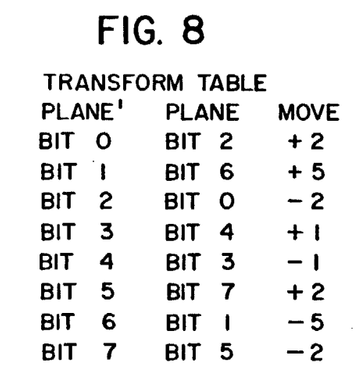
FIG. 8 is a table which indicates the transforms to be applied to each bit position of register D to obtain the proper bit position order for plane 0 in the bit planar memory.

In FIG. 8, a transform table is shown which describes the required bit movements. For instance, the bit in the 0 position in register D must be moved two bit positions to the right to be properly aligned with plane 0. The subsequent bits in register D, i.e., 1–7 must be moved a number of bit positions equivalent to the number shown in the "move" column in the transform table. It should be realized that each byte which contains a plane' organization is invariably subjected to the same transform to achieve a proper orientation for subsequent storage in bit planar memory 16. The shift instructions in steps 5, 8, 11 and 13 are structured so that the same transform invariably applies.

Figure 9:
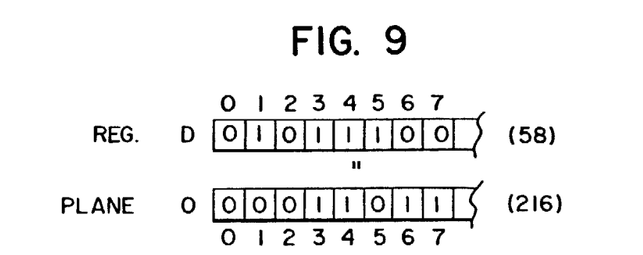
FIG. 9 is an example of the transform.

It can be thus seen that the binary number contained in register D will, after being subjected to the aforementioned transform, equal some other binary number. In FIG. 9, this is illustrated by an example wherein the various bit positions within register D have had binary values placed therein equivalent to the number 58. By subjecting those binary values to the transform illustrated in the transform table of FIG. 8, the arrangement shown in plane 0 occurs and is equivalent in value to 216. Since there are 8 bits in each byte, it can be seen that there are no more than 256 corresponding numbers which can exist for any value appearing in a register. Thus, a table is constructed within central processor 14 (e.g., table 24 in FIG. 1) which provides for the aforementioned transform. As each binary value is read from a byte of one of registers A–D, its value is translated into the proper binary value by table 24, using a table lookup procedure.

STEP 15

After the above described table look-up has occurred, the proper values are inserted into registers A and D and are subsequently stored in planes 0–3 of bit planar memory 16.

STEP 16

At this stage, the algorithm continues by accessing word 3 which begins at bit position 32 (byte 5). The algorithm continues with words three and four as described in Steps 2 and those that follow, until all words have been converted and written into bit planar memory 16.

It should be noted that in lieu of sequentially travelling from planes 0 to plane 3 as with words 1 and 2, (see arrow 30 in FIG. 2) the planes are considered in the reverse order, (i.e., of from plane 3 to plane 0) for words 3 and 4 (see arrow 32 in FIG. 2). By continuing the algorithm in this boustrophedonic manner, (i.e. "as the ox plow furrows") considerable processing time is conserved. Furthermore, it is to be understood that by handling two words at a time, the number of memory accesses is halved thereby providing additional substantial time savings.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

We claim:

1. A method for transferring data units a serially organized memory to a bit-planar organized memory, the method comprising:
    selecting a plurality of data units from said serially organized memory;
    capturing a bit pattern from said plurality of data units, said bit pattern including only bits to be stored in a subset of storage planes in said bit planar organized memory;
    isolating from said bit pattern, subsidiary bit patterns, each said subsidiary bit pattern to be stored in one storage plane of said subset of storage planes; and
    translating each said subsidiary bit pattern into a form suitable for storage in a plane of said bit planar organized memory.

2. The method of claim 1 wherein each said isolated bit pattern includes all of the proper bit positions to be stored in a storage plane, but in an arrangement not suitable for storage therein.

3. The method of claim 2 wherein said translating step includes the further step of:
    accessing from a table a corresponding bit pattern to said subsidiary bit pattern, said corresponding pattern exhibiting a sequence of bits suitable for storage.

4. The method of claim 3 wherein said selecting step provides a pair of data units.

5. The method of claim 4 wherein said capturing step comprises:
    applying a mask to said pair of data units to enable a capture of all the bits therein to be stored in at least a pair of planes of said bit planar memory.

6. The method of claim 5 wherein the bits captured from one data unit are shifted and combined with bits captured from the other data unit.

7. The method of claim 6 wherein said isolating step comprises:
    applying a mask to said combined bits to further segregate said bits into four groups; and
    shifting and combining said four groups into two said subsidiary bit patterns.

8. The method of claim 7 wherein said data units are words and said selecting step accesses two words containing two bytes each.

9. A method for transferring data units from a serial memory to a bit planar memory, each plane of said bit planar memory including only odd or even bit positions, but not both, the method comprising:
    selecting a pair of words from said serial memory, each said word containing at least one display data unit, and placing said selected words into first and second registers;
    applying a mask to said selected pair of words to remove therefrom all odd numbered bits so that only bits in even bit positions remain in said registers;
    shifting the bit in one said register and merging said shifted bits with the bits stored in the other said register so that both said registers contain all even bits of said selected words;
    applying a second mask to the bits stored in said registers to partially segregate said even bits within said registers;
    merging said partially segregated bits to assemble the even bits to be stored in each said plane of said bit planar memory, said assembled even bits organized in improper order;
    translating said assembled even bits to their proper order; and
    storing said translated even bit positions into said planes of said bit planar memory.

10. The invention as defined in claim 9 wherein after said selection step, the recited steps in claim 9 are repeated with said masks being applied to eliminate said even bit positions from said selected words and said subsequent steps acting to shift, mask, merge, translate and store the remaining odd bits in said planes of said bit planar memory.

11. The invention as defined in claim 9 wherein said merging step further includes shifting the bits within one register and subsequently combining said shifted bits with the partially segregated bits of the other register.

12. The invention as defined in claim 11 wherein said translating step comprises accessing from a table, a corresponding bit pattern to said improperly organized bit order, said corresponding bit order exhibiting a sequence of bits suitable for storage in a plane of said bit planar memory.

* * * * *